Figures 1, 2, 3:
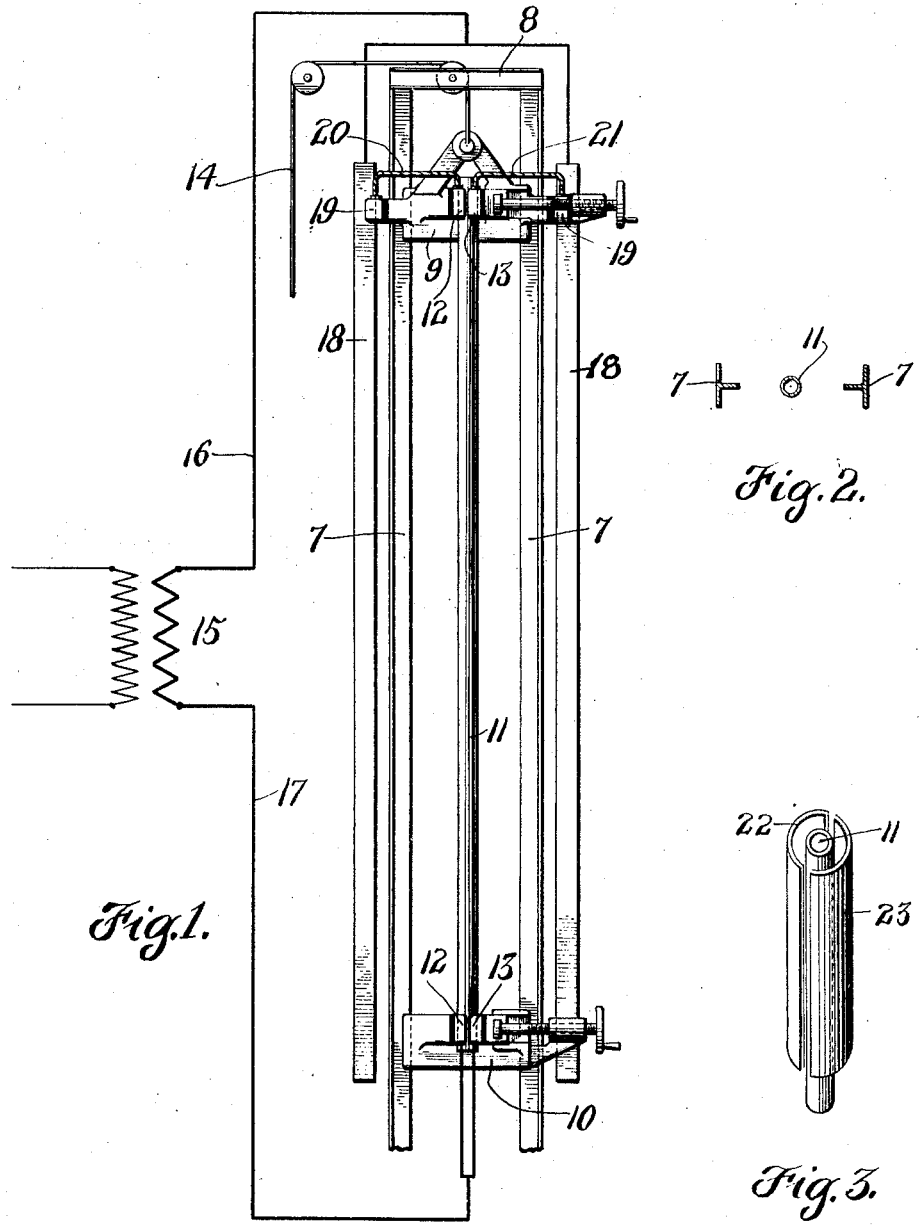

H. P. MACDONALD.
METHOD OF AND APPARATUS FOR HEAT TREATING METALLIC ARTICLES.
APPLICATION FILED AUG. 5, 1919.

1,344,643.

Patented June 29, 1920.

WITNESS:
Gustav Genzlinger.

INVENTOR.
Harry P. Macdonald
BY
Synnestvedt & Lechner
ATTORNEYS.

UNITED STATES PATENT OFFICE.

HARRY P. MACDONALD, OF MONTCLAIR, NEW JERSEY, ASSIGNOR TO THE SNEAD & CO. IRON WORKS, A CORPORATION OF NEW JERSEY.

METHOD OF AND APPARATUS FOR HEAT-TREATING METALLIC ARTICLES.

1,344,643.     Specification of Letters Patent.     Patented June 29, 1920.

Application filed August 5, 1919. Serial No. 315,385.

*To all whom it may concern:*

Be it known that I, HARRY P. MACDONALD, a citizen of the United States, residing at Montclair, in the county of Essex and State of New Jersey, have invented certain new and useful Improvements in Methods of and Apparatus for Heat-Treating Metallic Articles, of which the following is a specification.

This invention relates to a method of and apparatus for heat treating metallic articles, and has particular reference to heat treating by the internal resistance of the article to the passage of an electric current therethrough.

In the electrical heat treatment of metallic articles, such for example as long, relatively thin tubing, and the like, I have found that the work becomes crooked in the machine, apparently because the magnetic field set up by the passage of the heavy current through the conductors would attract the tubes, and, when it was in its soft state, due to the high temperatures, bend it; after which when the tube reached its calescent point and became nonmagnetic, the field set up by the conductors and by the tubes repulsed each other and forced the tube back, tending to kink it. I have also discovered that the arrangement of the iron or steel parts of the machine with reference to the piece being treated is of great importance in this regard.

Upon experimentation, I have discovered that the foregoing difficulties may be obviated, for example, by so relatively arranging the conductors and the work that the latter lies outside of any magnetic field that may be set up by the conductors, or by shielding the work from the magnetic field, or by so arranging the iron and steel parts that they lie outside the magnetic field set up by the current passing through the work, or the magnetic pull of one part will counterbalance the pull of the other.

I accomplish the foregoing, together with such other objects as may hereinafter appear, by means of a method and apparatus more or less diagrammatically disclosed in the accompanying drawings, wherein—

Figure 1 is a side elevation of a machine embodying my improvements; Fig. 2 is a perspective view of a modification of my invention; and Fig. 3 is a section showing the symmetrical arrangement of the frame and the work.

Referring now to the apparatus employed in carrying out my invention, it will be seen that the machine comprises a framework, preferably composed of two vertical T rails 7, connected at the top by members 8 and supported in any suitable manner. Slidably supported on the rails 7 are a pair of carriages 9 and 10, adapted to receive and support a tube 11 or other metallic article to be treated, the carriages being slidable so they will accommodate themselves readily to different lengths of tubing and to the expansion and contraction of the tubing. Each carriage is provided with a pair of contact jaws 12 and 13, the former of which is stationary and the latter movable toward and from the stationary jaw for clamping and releasing the tube. Any preferred means may be utilized for operating the movable jaw and it will be apparent that the carriage mechanism as a whole may be given any form suitable for the configuration of the particular article or articles undergoing heat treatment.

The upper carriage may be supported in any preferred manner, as for example by the cable 14 which may be associated with temperature indicating mechanism such as shown, for example, in the co-pending application of Macdonald & Huggins Serial No. 296,217, filed May 10, 1919. With the work in place and clamped between the pairs of jaws, it will be seen that the lower carriage is supported from the upper carriage through the medium of the work. By this arrangement, as before indicated, the apparatus accommodates itself to the expansion and contraction of the work.

Attention is now directed to the means for conducting current to the work. The reference number 15 denotes a transformer, and the leads are respectively numbered 16 and 17. A conductor in the form of a bus bar, 18, is located on each side of the machine, preferably in alinement with one of the guide rails 7, such bus bars being of considerable length so that the machine will readily accommodate itself to varying lengths of work to be treated. The lead 16 is forked, one branch leading to each bus bar. Secured to opposite sides of the carriage 9 and insulated therefrom is a brush 19 adapted to slidably engage with a bus bar so that the carriage may be adjusted to the length of the particular article being treated. The jaws 12 and 13 are also insulated from the carriage 9 and current is conducted from the respective brushes 19 to the respective jaw by means of the cables 20 and 21, which are well removed from the work. The jaws 12 and 13 of the lower carriage are also insulated therefrom and such jaws are connected with the lead 17 at their lower ends.

One of the advantages of the foregoing arrangement is that the work is not subjected to any field that might be set up in the conductors for the reason that the conductors only carry current to that portion above the carriage 9 and in contact with the brushes 19. It follows, therefore, that no field can be set up around the conductors below the upper portion of the tube engaged by the jaws 13. In this connection, attention is directed to the fact that the vertical portions of the leads are kept sufficiently far from the machine to avoid any appreciable magnetic influence on the work from the fields set up by the leads. Furthermore, the disposition of the cables 20 and 21 above the carriage is such that any field set up thereabout will not materially affect those portions of the tubing below the jaws 12 and 13.

It is furthermore to be observed that since the framework of the machine is arranged symmetrically with reference to the work supported therein, the magnetic pull of one guide rail will counteract the pull of the other so that no distorting action on the tube can take place. It will be apparent that the lower end of the tube will not be subjected to any magnetic field tending to distort it.

The work may also be shielded from any magnetic field that might be set up, to which end I may provide a pair of shields 22 and 23, as shown for example in Fig. 2, which may be composed for example, of any suitable magnetic material such as soft iron and ore supported around the work.

It will be understood that the invention is not limited to any particular form of heat treating operation and the term "heat treatment" as employed herein and in the claims is to be understood in a broad sense.

I claim:

1. The herein described process of heat treating metallic articles by their internal resistance to the passage of an electric current therethrough, which consists in conducting the current thereto in such manner that the article will not be subjected to distorting magnetic factors.

2. The herein described process of heat treating metallic articles by their internal resistance to the passage of an electric current therethrough, which consists in passing current therethrough and protecting the work as against distorting magnetic factors.

3. The herein described process of heat treating metallic articles by their internal resistance to the passage of an electric current therethrough, which consists in conducting the current thereto in such manner that the article will not be subjected to any magnetic field set up by the passage of the current through the conducting means.

4. In apparatus of the character described, the combination of means for supporting the work, and means for conducting an electric current to the work, said last mentioned means being arranged with reference to the work so that the latter is substantially protected from the magnetic field set up by the passage of the current through the conducting means to such an extent as to prevent distortion thereof.

5. In apparatus of the character described, the combination of means for supporting the work, means for passing an electric current through the work, and means for shielding the work from magnetic influences set up by the passage of the current through the said second means.

6. In apparatus of the character described the combination of frame members and means for supporting the work within the frame arranged so that the work and the members of the frame are symmetrically disposed, whereby the magnetic pulls of the frame members will counteract one another.

7. In apparatus for heat treating metallic articles by means of passing an electric current therethrough, the combination of a support constructed for adjustment to accommodate articles of varying lengths, and conductors for conducting the current to the article arranged to permit of the adjustment of the machine to articles of varying lengths and at the same time to avoid possibility of deformation of the article undergoing treatment due to any magnetic influence set up by the current passing through the conductors.

8. In apparatus for heating articles by means of passing an electric current therethrough, the combination of a frame, article engaging supports adjustably carried thereby, terminals for said supports, and means for connecting the terminals with a source of supply inclusive of a conductor and brush means carried by one of said supports slidably engaging said conductor.

9. In apparatus for heating metallic articles by passing an electric current therethrough, the combination of a frame, supports in said frame adjustably carried thereby and provided with terminals, and means for connecting said terminals with a source of supply inclusive of a fixed conductor element and means contacting therewith carried by one of said supports.

10. In apparatus of the character described for heating metallic articles by passing an electric current therethrough, the combination of a frame, a pair of article receiving supporting members, at least one of which is slidably carried by the frame, a terminal for each supporting member, a lead for one terminal, and lead means for the other terminal including a bus bar, a contact carried by the movable supporting member slidably engaging said bus bar, and means connecting said contact with the terminal for said supporting member.

11. In apparatus for heating metallic articles by passing an electric current therethrough, the combination of supporting means adapted to receive the article to be treated and adjustable to accommodate articles of varying lengths, and means for conducting current to the article arranged to permit adjustment of the supporting means and so located as to reduce the liability of deformation of the article due to magnetic field set up by the passage of the current through the conducting means.

12. In apparatus for heating metallic articles by means of passing an electric current therethrough, the combination of a frame provided with carriages to support the article being heated, one of said carriages being adjustable in position to accommodate articles of varying lengths, a bus bar situated adjacent the machine, a contact carried by the movable carriage and bearing against a bus bar, a lead from the bus bar to the movable carriage, and a current conductor connected with the far end of said bus bar from the non-adjustable carriage, whereby the portion of the bus bar lying opposite the article being heated does not carry currents.

In testimony whereof I have hereunto signed my name.

HARRY P. MACDONALD.